Sept. 16, 1958  E. G. DE CORIOLIS ET AL  2,852,650
INDUCTION HEATING APPARATUS AND METHOD
Filed July 9, 1956  9 Sheets-Sheet 1

Fig.13.

INVENTORS
E. G. de Coriolis
W. M. Hepburn
BY J. J. Turin
E. K. Bastress-Decd.
A. J. Conkle-Com.

Sept. 16, 1958  E. G. DE CORIOLIS ET AL  2,852,650
INDUCTION HEATING APPARATUS AND METHOD
Filed July 9, 1956  9 Sheets-Sheet 3

Fig_16.

Fig_17.

INVENTORS
E. G. de Coriolis
W. M. Hepburn
BY J. J. Turin
E. K. BASTRESS-DEC'D
A. J. CONKLE-COM.

Sept. 16, 1958 E. G. DE CORIOLIS ET AL 2,852,650
INDUCTION HEATING APPARATUS AND METHOD
Filed July 9, 1956 9 Sheets-Sheet 4

Fig.1.

INVENTORS
E. G. de Cariolis
W. M. Hepburn
BY J. J. Turin
E. K. Bastress-Dec'd.
A. J. Conkle-Com.
Charles J Daugley
Atty Sept. 16, 1958     E. G. DE CORIOLIS ET AL     2,852,650
INDUCTION HEATING APPARATUS AND METHOD Filed July 9, 1956     9 Sheets—Sheet 5

INVENTORS
E. G. de Coriolis
W. M. Hepburn
J. J. Turin
E. K. Bastress–Dec'd
A. J. Conkle–Com.

BY Charles S Haughey
atty.

INVENTORS
E. G. de Coriolis
W. M. Hepburn
J. J. Turin
E. K. Bastress-Dec'd.
A. J. Conkle-Com
BY
Charles J. Haughey

INVENTORS
E. G. de Coriolis
W. M. Hepburn
J. J. Turin
E. K. Bastress—Dec'd.
A. J. Conkle—Com.
BY Charles S. Haughey United States Patent Office 2,852,650
Patented Sept. 16, 1958

2,852,650

INDUCTION HEATING APPARATUS AND METHOD

Ernest G. de Coriolis, Toledo, William M. Hepburn, Ottawa Hills, and John J. Turin, Toledo, Ohio, and Ernest K. Bastress, deceased, late of Toledo, Ohio, by Allan J. Conkle, legal representative, Toledo, Ohio, assignors to Surface Combustion Corporation, Toledo, Ohio, a corporation of Ohio Application July 9, 1956, Serial No. 597,836

6 Claims. (Cl. 219—10.67)

Major advantages and characteristics of continuous inductive heating well known to those skilled in the art include rapid heating, minimum production room floor space and the like.

In the application of conventional inductive heating to the forging or hot working field, it has been found that unpredictable delays of varying duration at the press or hammer cause severe difficulties in the heating operation. Normal, continuous, inductive billet heating relies upon a delicate balance between energy input to an inductor and billet residence time in the field of the inductor to produce a desired result. Heretofore, when the continuity of such heating has been interrupted, it has been the ordinary practice to de-energize the inductor, and to empty the furnace of billets. According to such ordinary practice, cold billets are charged to the furnace to resume operation after a shut-down, with the result that the first heated billet available for forging goes through the entire heating cycle after resumption of furnacing. Billets that had been in the furnace at the time of shut-down are usually cleaned, and subsequently re-charged to the furnace.

An ideal solution to the problem of heating billets for hot working would be a furnace which normally produced scale-free billets at proper temperature and at sufficiently high heating rates that it could occupy a minimum of working floor space, and at the same time where delivery of work could be interrupted for any length of time and delivery of properly heated, scale-free billets resumed immediately at any desired time.

The present invention provides a practical solution to this problem which approaches very closely the ideal solution set forth. Induction heating equipment is provided having means for supplying and maintaining a non-scaling atmosphere within the heating coils and in ducts for transferring heated billets to the press or other hot working machine, and control means for interrupting the billet pushing cycle, for holding billet temperatures during such interruption, and for starting the pushing cycle again at any time to deliver satisfactory billets to the press.

Application of this invention to the forging art will bring an entirely new concept of heating, and will substantially eliminate long periods of waiting for heated work after shutdown, scale cleaning operations, repeated charging and discharging of induction furnaces and the like.

*Structure*

Figure 1:
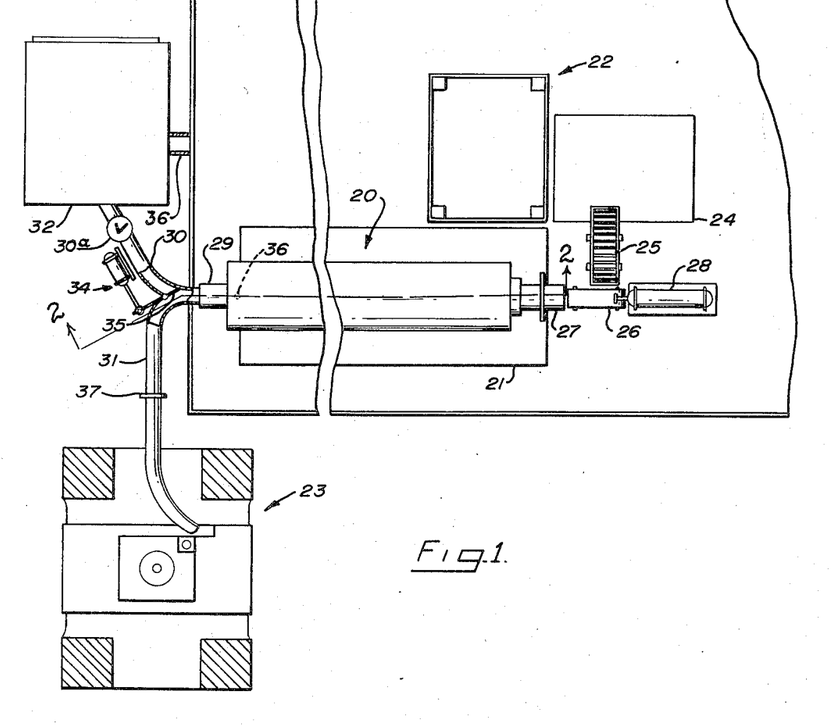
Fig. 1 is a greatly simplified fragmentary plan view of an inductor heating furnace embodying controlled atmosphere flow according to the invention.

An induction heating furnace embodying the invention is generally indicated in Fig. 1 at 20. The furnace 20 may be mounted upon a suitable platform or base 21 near a billet storage hopper generally indicated at 22 and also near a press generally indicated at 23 upon which the heat treated billets are subjected to a subsequent fabricating step such as forging. A working platform 24 is located adjacent the storage hopper 22 and provided with a charging chute 25 leading to a charging table 26 adjacent an entrance chamber 27 of the furnace 20. A fluid actuated ram 28 may be utilized to move the billets axially off the table 26 and into the chamber 27 and through the furnace 20.

At the exit end of the furnace 20 there is located a discharge chamber 29 leading to a pair of chutes, a reject chute 30 and a discharge chute 31. The reject chute 30 leads to a cooling chamber 32. The discharge chute 31 leads directly to a position adjacent the working table of the press 23.

The length of the furnace 20 and the rapidity of actuation of the fluid cylinder 28 are determined by the duration of the heat treatment necessary to be performed upon the billets in order to prepare them for subsequent operation on the press 23. The ram 28 is actuated periodically to thrust the billet on the table 26 forwardly, pushing the solid column of billets through the furnace 20 and discharging the end billet from the chamber 29.

Figure 2:
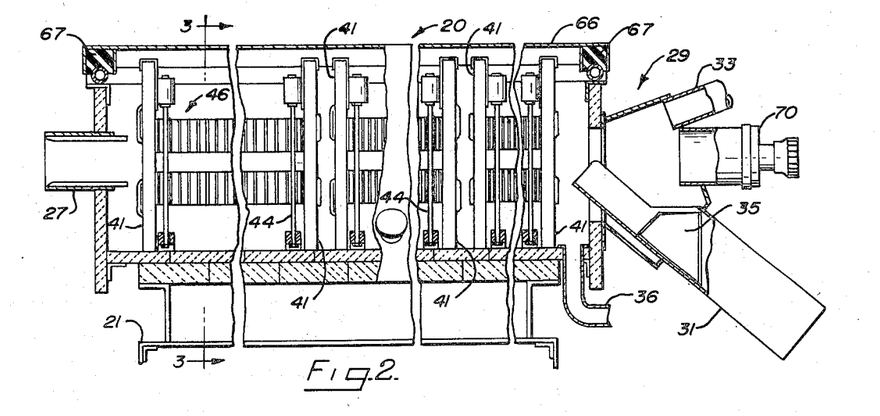
Fig. 2 is a longitudinal, vertical, sectional view taken substantially along the line 2—2 of Fig. 1, with parts broken away and other parts shown in elevation.

The chamber 29, as can best be seen in Fig. 2, also includes a temperature sensing device having an orifice indicated at 33, the sensing device itself not being shown in Fig. 2 (see Figs. 10 and 11), which senses the temperature of the billet being thrust out of the chamber 29 by the movement of the ram 28 to introduce a new billet into the furnace 20. If the temperature of the billet being discharged is above or below the working temperature range, the temperature sensing device through a control system to be later described, actuates a shutter mechanism generally indicated at 34 in Fig. 1, to swing a gate 35 to deflect the billet down the reject chute 30 to the cooling chamber 32. If the billet is within the correct temperature range the gate 35 remains in the position shown in Fig. 1 and the discharged billet slides down the chute 31 to the press 23.

A furnace embodying the invention is provided with a controlled atmosphere, usually including carbon monoxide gas and of reducing character, which preferably is fed into the furnace at its discharge end, as by a duct generally indicated at 36 in Fig. 2, its position being indicated by the reference number 36 in Fig. 1, so that the flow of atmosphere is contra to the movement of billets through the furnace 20. The discharge chute 31 is provided with a ring-like air induction device 37, not shown in detail in the drawings, but so constructed as to induce a slight flow of the controlled atmosphere of the furnace down the discharge chute 31. As shown in Fig. 1 a portion of the duct 36 also communicates with the cooling chamber 32 to maintain a slight positive pressure of the controlled atmosphere therein, and thus prevent the accumulation of scale on the surfaces of rejected billets while they are being cooled therein. The controlled atmosphere introduced into the duct 36 can be of substantially any non-scaling composition. Its dilution even with air introduced through the induction ring 37 does not cause scaling of billets or other work in the limited time before a forging or other operation is conducted on the press 23. The escaping atmosphere is usually burned at the end of the entrance chamber 27.

After the rejected billets are cooled in the chamber 32, a valve 30a in the reject chute 30 can be closed and the cool rejected billets removed from the chamber 32 and reintroduced into the billet hopper 22 or directly into the charging chute 25. The valve 30a can then be re-opened, the chamber 32 closed, and additional rejected billets collected therein. By storing the rejected billets in the controlled atmosphere of the furnace they remain scale-free, and entirely satisfactory for re-introduction and re-heating to the desired working temperature.

Figure 3:
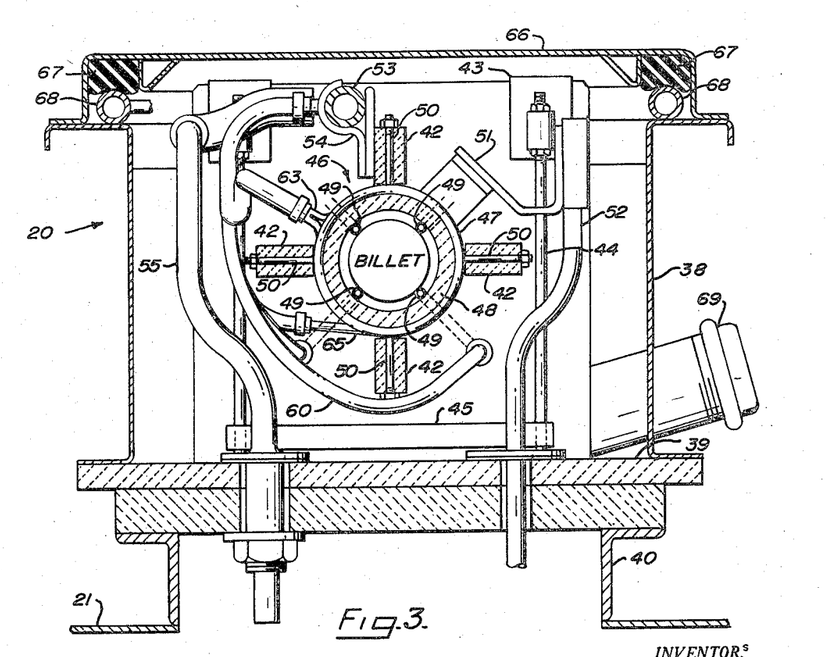
Fig. 3 is a transverse, vertical, sectional view on an enlarged scale taken along the line 3—3 of Fig. 2.

The furnace 20 (Figs. 2 and 3) has an outer metallic casing 38 erected upon an insulating base 39. The base 39 may be fabricated, for example, from a compressed asbestos material such as the material sold under the trade name "Transite." The insulating base 39 is erected and supported upon the base 21 by suitable channel members 40. In addition to the housing 38 the furnace has major structural elements consisting of transverse supporting plates 41 and longitudinally extending spacing bars 42, also preferably fabricated from a heat resistant material such as compressed asbestos. The bars 42 may be supported between the plates 41 by suitable brackets 43, tie rods 44 and crossbars 45 to form a rigid support structure for the furnace elements.

The furnace may have one or more heating units, such as the unit generally indicated at 46, each of which comprises a helically wrapped induction heating coil 47 which extends around the exterior of a hollow jacket 48 also formed from heat resistant material such as compressed asbestos and which actually forms the chamber of the furnace through which the billets move longitudinally. Interiorly of the jacket 48 there are located four spaced hollow skid rails 49 on which the billets slide through the jacket 48. The billets are shown in cross-section in Figs. 3, 4-6, 8 and 9 and identified therein by legend.

The spirally wrapped induction coil 47 is structurally assembled in the furnace by means of radially extending bolts 50 brazed or otherwise secured to the exterior of the induction coil 47 and extending through the longitudinal bars 42. The induction coil 47 is electrically connected to a suitable source of controlled electrical energy by jumper bars 51 connected to water cooled bus bars 52. The bars 51 and 52 are present in such numbers as is necessary to make electrical connections for the energization of the three induction coils 47 of the embodiment of the invention illustrated in Figs. 2-3 or such other numbers of coils as may be employed in other embodiments of the invention.

The furnace illustrated in Figs. 1 and 2 is provided with three complete heating units such as the unit 46 arranged in coaxial and end-to-end relationship, each of the heating units being complete and each capable of independent energization. The foregoing structural description applies to each of the separate heating units 46 and the following description of the water circulation system also applies to each of the separate heating units 46. Furnaces embodying the invention may comprise one heating unit or two, three or more in axial alignment.

Figure 7:
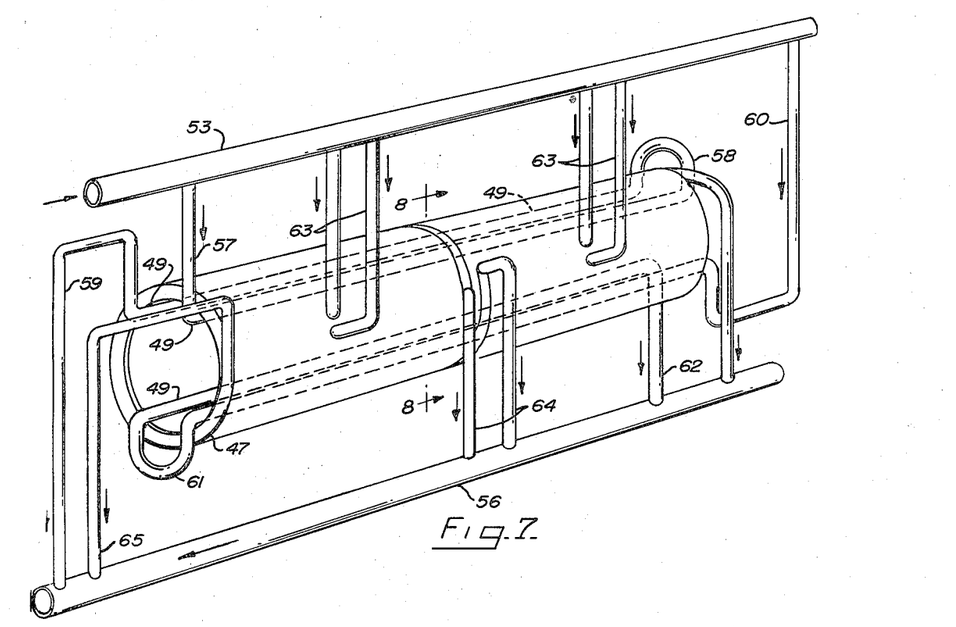
Fig. 7 is an isometric phantom view of an induction heating furnace and illustrating in particular the water cooling circuits.
Figure 8:
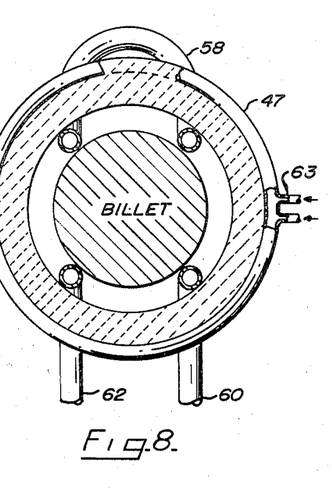
Fig. 8 is a fragmentary, transverse, vertical sectional view taken substantially along the line 8—8 of Fig. 7.

The water circulation system by means of which the induction coils 47 are cooled is illustrated in the isometric phantom view of Fig. 7, although Fig. 7 shows only two induction coils 47, it being merely illustrative in this regard and the same circulation system is used for a lesser or greater number of coils. A main water header 53 (see also Fig. 3) extends longitudinally along above the unit or units 46 of the furnace and may be employed to supply water to all of the heating units of a furnace. The header 53 is supported by suitably shaped clamps 54 (Fig. 3) mounted upon the bars 42. The header may be fed by a main water inlet pipe 55 and suitable drain pipes, to be described, carry the water to a return duct 56 (Fig. 7), not shown in Fig. 3. The skid rails 49 are included in the water circulation system. For example, a pipe 57 leads from the header 53 to one of the upper skid rails 49, which extends along the entire length of the heating section of the furnace, and is connected by a U-tube 58 to the other one of the upper skid rails 49. This second upper skid rail 49 is connected by a pipe 59 to the duct 56. Similarly, the lower skid rails 49 are connected by an input pipe 60, U-tube 61 and output pipe 62 between the header 53 and duct 56. Each of the induction coils 47 is linked into the water circulation system by pairs of input pipes 63 and output pipes, such as the pair of pipes 64 or the end pipe 65, so that water flows through the induction heating coil 47 for cooling the tube itself.

The furnace 20 is provided with a removable cover 66 (Figs. 2 and 3) having a rubber gasket 67 which rests upon a water cooled perimeter pipe 68. Removal of the cover 66 provides access to the interior of the furnace 20. The furnace 20 also may be provided with one or more access ports 69 extending through its side walls and with an axial sight glass 70 (Fig. 2) aligned with the bore of the furnace and located in the chamber 29.

The embodiment of the furnace so far described is illustrated in Figs. 2, 3, 4, 7 and 8. In this embodiment of the furnace, whether there are one, two, three or more individual induction coils 47 in axial alignment, each coil 47 consists of a single uniformly spaced helical tube. Induction heating of the billets intermittently advanced axially through a uniformly spiralled induction coil 47 progresses in accordance with the solid line curves of Figs. 14 and 15, as is subsequently discussed in more detail.

Figure 5:
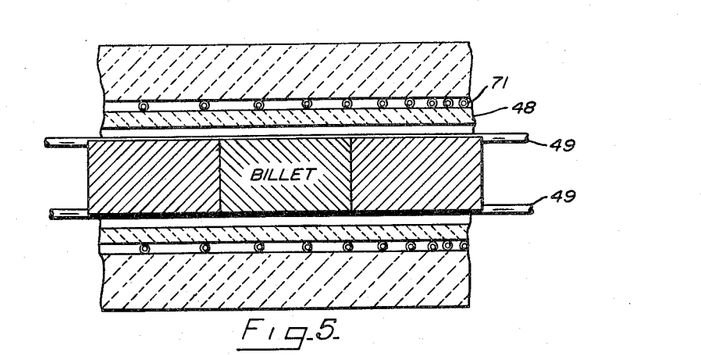
Fig. 5 is a view similar to Fig. 4 but illustrating another modification of induction heating coil design.
Figure 6:
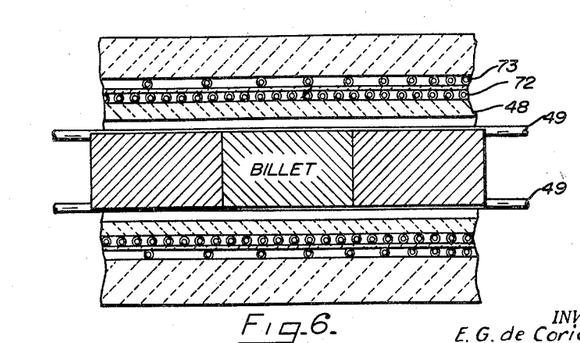
Fig. 6 is a view similar to Figs. 4 and 5 but illustrating yet another embodiment of a furnace combining the induction heating coils shown in Figs. 4 and 5.
Figure 9:
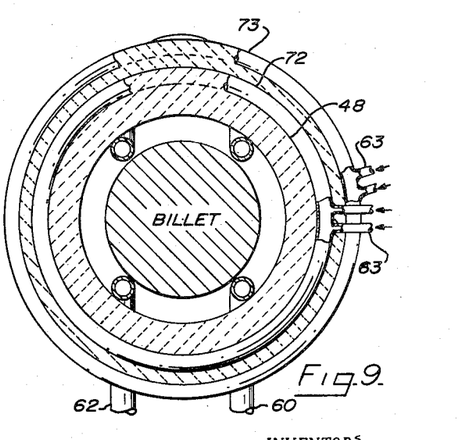
Fig. 9 is a view similar to Fig. 8 but illustrating the induction heating coil arrangement shown in Fig. 6.

It may be desirable in many instances to exercise more control over the rate of heating the work than is possible with a heat induction coil 47 of uniform spiral even where more than one is located in the furnace and variations in heating coil construction according to the invention are illustrated in Figs. 5, 6 and 9 by which such additional control may be achieved.

Figure 4:
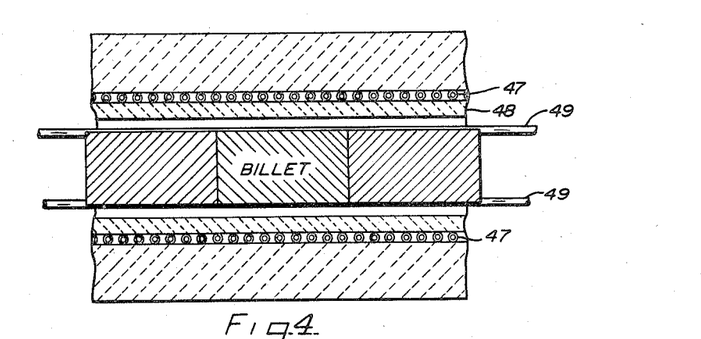
Fig. 4 is a simplified, longitudinal, vertical sectional view of a fragment of an induction furnace embodying the invention and illustrating one modification of induction heating coils.

Referring first to Fig. 4, the construction of the heating coil 47 shown there is the same as that shown in Figs. 1 and 2, i. e., the spiral is uniform along the length of the coil 47. In Fig. 5 a progressive spacing of the turns of the spiral is illustrated by a heating coil 71 shown as being constructed with a helix spaced generally logarithmically. Constructing the induction coil 71 with generally logarithmical spacing between its turns provides a particularly advantageous way for preventing electrical overload upon resumption of heating after a shut-down, as previously mentioned and subsequently discussed in more detail.

Fig. 6 illustrates an arrangement in which two induction heating coils indicated at 72 and 73 are coaxially arranged exteriorly of the jacket 48. In Fig. 6 the coil 72 is illustrated as having a regular helical spacing while the coil 73 has progressively spaced turns, being illustrated as generally logarthmically spaced. An induction furnace with two such concentrically wound coils, when the coils are properly controlled, as subsequently discussed, constitutes excellent means for preventing electrical overload upon resumption of heating after a shut-down.

*Prevention of electrical overload*

In many respects an induction furnace is similar to a transformer. For example, the current flowing through a transformer primary is negligible when the transformer secondary is on open circuit, and is some fixed amperage when the transformer secondary is on closed circuit of any given resistance. In general, the current flowing in a transformer primary is an inverse function of the resistance in the closed secondary circuit. When a cold steel billet is introduced into the field of an inductor, the billet acts as the secondary coil of a transformer and as a closed secondary circuit, and the inductor acts as the primary coil of that transformer. Eddy currents set up mainly in the surface of the billet cause heating thereof. So long as the billet remains relatively cold, and its magnetic properties unchanged, an approximately constant current will flow through the inductor, which is similar to the primary coil of a transformer. Increased resistance to the flow of eddy currents in the surface of the billet occurs as the temperature thereof increases, and causes this current to decrease slightly as heating progresses. In this instance, therefore, the inductor acts as the primary coil of a transformer, and the surface of a billet in the field of the inductor acts both as the secondary coil of the transformer and as a low resistance closed secondary circuit. If two, three, four or more cold billets were introduced simultaneously into the field of an inductor the current which would flow through the inductor, acting as a transformer primary, would be approximately two, three, four or more times that which flows when a single cold billet is introduced into such field. Similarly, if an induction furnace fully loaded with sixty cold billets were energized, the current flowing through the inductor would immediately be approximately sixty times that which would flow when a single cold billet was introduced into the field of the inductor of that furnace.

As a single steel billet in the field of an inductor is heated it ultimately reaches a temperature where ferrite and cementite, both of which are magnetic, change to austenite, which is non-magnetic. With further heating, and at a temperature which is dependent upon the composition of the billet, the entire billet becomes austenitic. This phase change in the billet has the effect of making the inductor-billet far less effective as a transformer, and might be likened to the removal of a magnetic core from a conventional transformer. As a result, after such phase change, substantially lower voltages are induced on the surface of the billet; the resulting eddy currents are of substantially decreased magnitude; heating proceeds at an appreciably lowered rate; and the current flowing through the inductor is substantially reduced.

In an induction furnace which is in normal operation, with room temperature billets being pushed into the charge end thereof every few seconds, it is to be expected that billets will have been heated to a temperature of about 1300° F. where the phase change from ferrite and cementite to austenite begins, in about the first one-fourth of the furnace. Therefore, somewhere near fifty percent of the current flowing through the inductor of an induction furnace which is in normal operation can be attributed to the heating of billets in about the first one-fourth of the furnace. The remaining fifty percent of the current flowing through the inductor can be attributed to the heating of billets in the remaining three-fourths of the furnace.

The foregoing discussion will make it clear that energizing an induction furnace filled with cold billets would cause an unduly high current flow through the inductor, perhaps twice the current that flows when the furnace is in normal operation. Furthermore, such high current flow would not be an instantaneous problem, but would continue until the billets reached a temperature at which the phase change from ferrite and cementite to austenite began to occur, which might require a time of the order of one minute.

Most induction furnaces are powered by motor generators. Because of the extremely large power consumptions of commercial induction furnaces, the necessary motor generators usually account for a major portion of the cost of an induction furnace installation. For this reason it is not feasible to provide a commercial induction furnace installation capable of carrying the electrical load which would result if the inductor of the furnace were energized when the furnace was fully loaded with cold billets. The previously discussed practice of manually emptying an induction furnace for a shut-down, energizing the inductor, with the furnace empty, when it was desired to resume operations after the shut-down, and then beginning the charging of billets into the empty furnace avoids such overload, but also involves a substantial amount of labor, in addition to time delay, beyond the actual period of shut-down.

Furnaces according to the invention wherein a non-scaling atmosphere is established and maintained in contact with the surfaces of billets or other blanks during inductive heating thereof, and during transfer to a hot-metal working device associated with the induction furnace, enable shut-down of the furnace without the necessity for removing billets therefrom, or without the "broomsticking" operation, as such manual removal is often called in the art. The presence of the non-scaling atmosphere in contact with the surfaces of the billets or other blanks makes it possible to cool the billets in the furnace at the time of the shut-down, and at any later time to re-heat the billets to a desired working temperature; insofar as scale is concerned, the heated billets or blanks are identical with other billets or blanks that complete a furnacing operation without interruption. They are delivered to associated apparatus for working hot-metal in a scale-free condition.

In a preferred combination according to the invention, however, means are provided for preventing electrical overload upon energization of the inductor after a shut-down, and when the furnace is fully loaded with billets. In general, such means are usually control devices, and may prevent the electrical overload by maintaining, during standby or shut-down, the billets or other blanks in at least a substantial portion of the induction furnace at a temperature within the austenite range for such billets or other blanks; by independently energizing, sequentially, each of a plurality of inductor segments, or by regulating the power input to the motor generators, or the output therefrom, until at least a substantial portion of the billets or other blanks in the furnace have been heated to a temperature sufficiently high that the phase change to austenite has commenced. Various specific controls for accomplishing these different results will now be discussed in detail.

Control circuits

Figure 10:
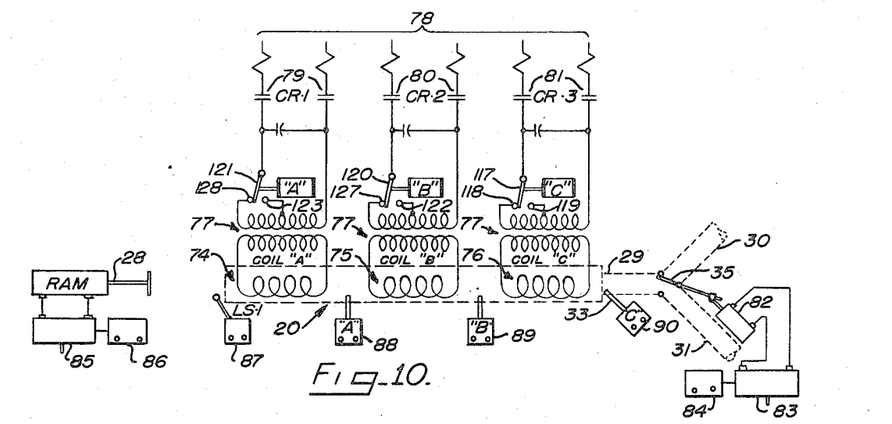
Fig. 10 is a schematic wiring diagram of the electric circuit for energizing the coils of an induction heating furnace according to the invention and utilizing the form of coils shown in Fig. 4.
Figure 11:
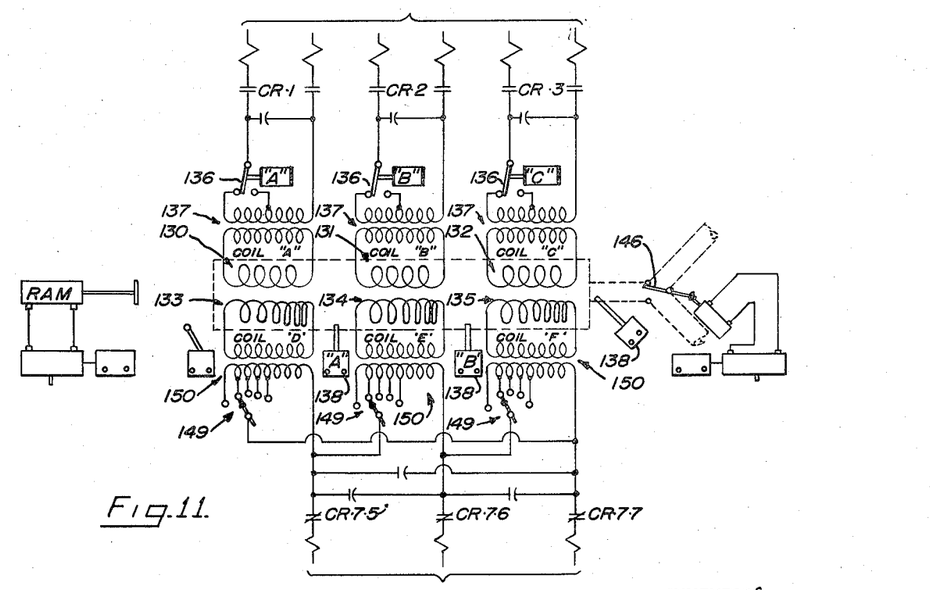
Fig. 11 is a diagram similar to Fig. 10 but utilizing heating coils arranged as shown in Fig. 6.
Figure 12:
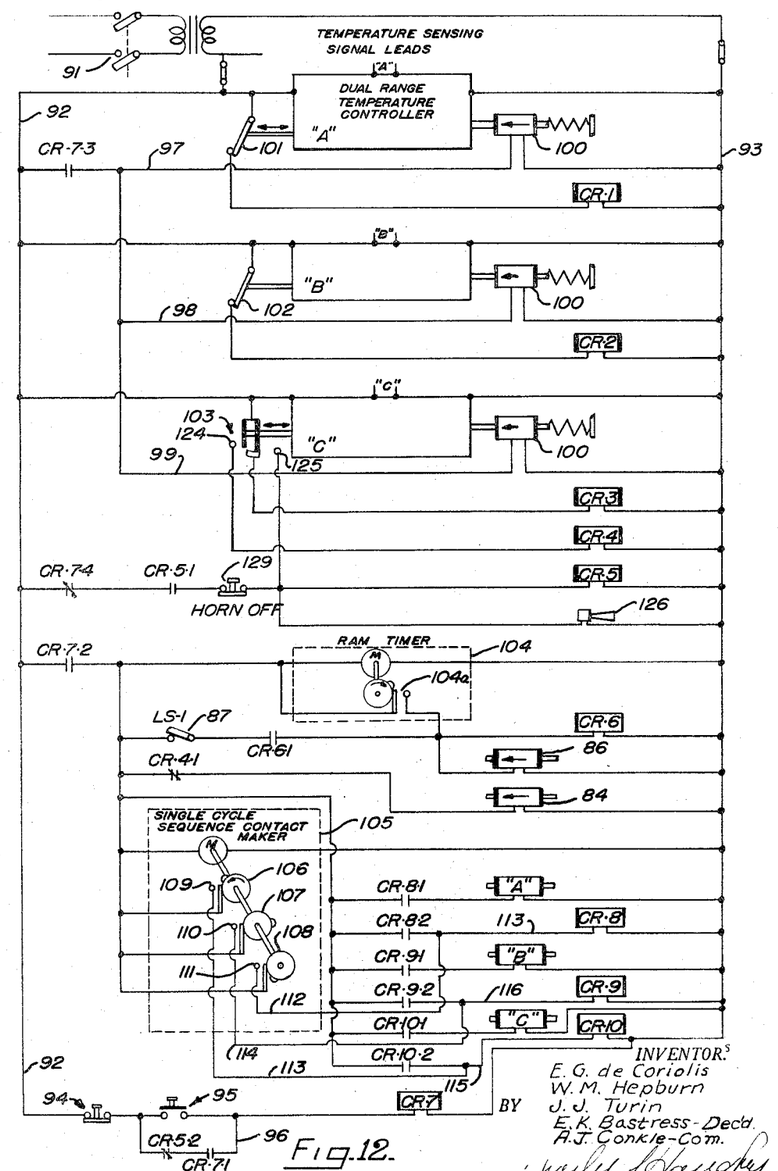
Fig. 12 is a schematic wiring diagram of an electric control circuit for a furnace having heating coils which are arranged and energized according to Fig. 10.
Figure 13:
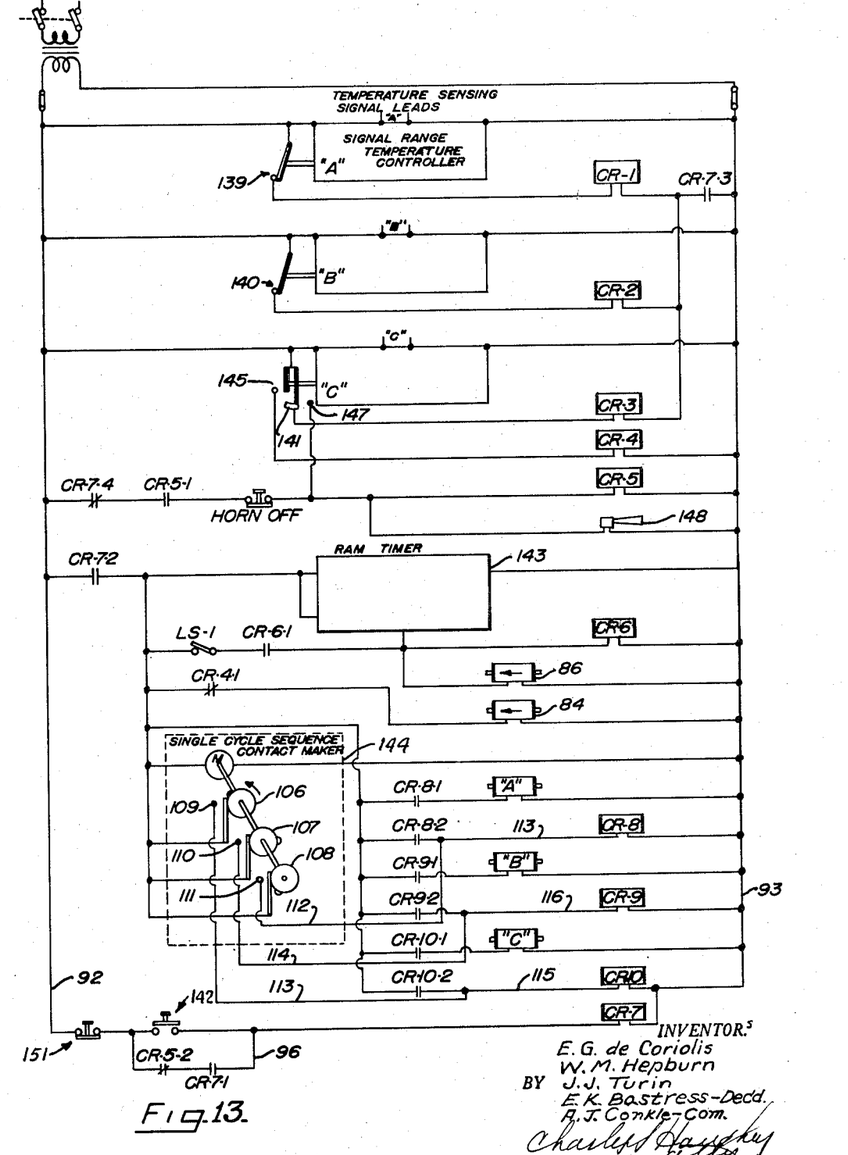
Fig. 13 is a diagram similar to Fig. 12 but for the control of a furnace utilizing heating coils energized according to Fig. 11.

The two circuits illustrated, respectively, in Figs. 10 and 12 and in Figs. 11 and 13 provide for automatic control of the operation of a furnace constructed according to the invention. Each of the furnaces comprises three coaxially arranged, individually energized induction heating coils of the type shown in Fig. 4 for normal operation and the furnace controlled by the circuits of Figs. 11 and 13 also has an additional set of three logarithmic coils as illustrated in Fig. 6 for standby operation.

In Fig. 10 three heating coils generally indicated at 74, 75 and 76 are denoted coils "A," "B" and "C," respectively. Each of the coils "A," "B" and "C" is energized through its own transformer 77 from a power line generally indicated at 78 with each pair of power leads controlled by a pair of normally open contacts 78, 80 or 81, respectively. The three pairs of contacts 79, 80 and 81 are actuated by control relays CR1, CR2 and CR3, respectively, to be described in connection with Fig. 12, and are so labeled in Fig. 10.

The heating furnace 20 is shown in broken line outline in Fig. 10 with the ram 28 shown at the left end of the furnace 20 and the deflecting gate 35 shown at the right, in connection with the reject chute 30 and discharge chute 31. The gate 35 is illustrated as being operated by a ram cylinder 82 controlled by a gate control valve 83 which is in turn controlled by a gate control value solenoid 84. The gate control valve is biased toward reject position of the gate (opposite to that shown in Fig. 10) by a spring or other means not shown. The feeding ram 28 is similarly controlled by a ram control valve 85 actuated by a ram control valve solenoid 86.

In Fig. 10 there is also illustrated a limit switch 87 denominated LS–1 which is actuated by the end of the ram 28 as it completes its forward stroke. Three temperature sensing devices 88, 89 and 90 are located with their sensing orifices extending into the body of the furnace 20 or the discharge chamber 29. The sensing device 88 is denominated "A" since it is located at the exit end of the induction coil "A"; the sensing device 89 being similarly located with respect to the induction coil "B" and the sensing device 90 having its orifice 33 located in the discharge chamber 29 and thus at the exit end of the induction coil "C."

Referring now to Fig. 12, the furnace control circuit illustrated therein has a main power switch 91 leading to main lines 92 and 93. Two push buttons 94 and 95 are connected in series with control relay CR7 between the line 92 and the line 93. The pushbutton 94 is normally closed and the pushbutton 95 normally open, the two pushbuttons being denominated "standby" and "run," respectively. A shunt line 96 is wired in parallel around the pushbutton 95 and comprises a normally closed contact CR5–2 and a normally open contact CR7–1, connected in series.

After the main switch 91 is closed to energize the control circuit the "run" pushbutton 95 is depressed establishing a circuit through the coil of control relay CR7 and closing its normally open contact CR–1 for establishing a holding circuit for relay CR7. Energization of the coil of relay CR7 also closes its normally open contacts CR7–2 and CR7–3 and opens its normally closed contact CR7–4. Closing normally open contact CR7–3 establishes circuits through parallel leads 97, 98 and 99 which energize the coils of three temperature range selectors 100 constituting parts of three dual range temperature controllers "A," "B," and "C." The temperature controller "A" is associated with the temperature sensing device 88 of Fig. 10 and controls energization of induction coil "A" of the furnace 20 by opening and closing a contact 101 in response to signals received in the temperature controller "A" from the temperature sensing device "A" or 88 of Fig. 10. When the contact 101 is closed the coil of CR1 is energized which closes its normally open contacts 79 (CR1–1) to place the transformer 77 of coil "A" in circuit.

Similarly, lead 98 energizes its temperature range selector 100 associated with temperature controller "B" which, through a contact 102 energizes the coil of relay CR2 and closes contacts 80 (CR2–1) to put coil "B" in circuit. At the same time, the temperature range selector 100 of the dual range controller "C" is energized and temperature controller "C" activated to control a dual contact 103 selectively positionable to energize control relay CR3 (center position), the control relays CR3 and CR4 (left position) or control relay CR5 (right position). Temperature controllers "B" and "C" respond to temperature sensing signals transmitted to them from temperature sensing devices 89 and 90 or "B" and "C," respectively, reflecting the temperatures existing in the furnace at the discharge ends of coils "B" and "C," respectively.

The temperature controllers "A," "B" and "C" are dual range controllers and the range of temperatures which they will maintain are selected by actuation of temperature range selectors 100. When the run button 95 is closed and contact CR7–3 is closed, energization of the solenoids of the temperature range selectors 100 sets the temperature controllers "A," "B" and "C" for temperature control in their higher range. The higher range is the range of temperatures normally to be maintained at the exit sides of the three coils "A," "B" and "C" during normal operation of the furnace.

Each of the temperature controllers "A," "B" and "C" moves its respective contact 101, 102 or 103 to energize control relays CR1, CR2 and CR3 and place the coils "A," "B" and "C," respectively, in circuit whenever the temperature in the sensing devices 88, 89 or 90, respectively, falls below the range to be maintained at those points.

At the initial starting of the furnace, contacts CR7–2 also are closed and they activate a ram timer 104 and a single-cycle sequence contact maker 105. The ram timer 104 is motor driven to periodically close a pair of contacts 104a and energize the ram control valve solenoid 86 and relay CR6 in parallel therewith. Energization of the solenoid 86 moves the ram control valve 85 to feed the ram 28 forwardly for pushing a billet into the furnace. Relay CR6 closes its normally open contacts CR6–1 to hold the solenoid 86 in circuit until the ram 28 engages the limit switch 87 (LS–1) opening its normally closed contacts and breaking the circuit through contact CR6–1 which drops the control relay CR6 and solenoid 86 out of circuit. A spring or similar biasing means is then relied upon to return the ram 28 to its restricted position. The ram timer 104 is set to operate at time intervals so selected that cold billets are inserted in the entrance to the furnace and hot billets ejected from the furnace to maintain a flow of billets through the furnace in a total period of time sufficient to heat them to the desired range under normal operations.

Closing the "run" button 95 and energizing relay CR7 and thus closing its normally open contact CR7–2 also energizes the motor of the single-cycle sequence contact maker 105. The sequence contact maker 105 has three control cams 106, 107, and 108 which sequentially close three sets of contacts 109, 110 and 111, respectively. The contact 111 is connected by a lead 112 to a lead 113 to control relay CR8. Similarly, contacts 109 and 110 are connected by leads 113 and 114 to leads 115 and 116 of control relays CR10 and CR9, respectively. Contact 109 is first closed by its cam 106 to place relay CR10 in circuit closing its normally open contacts CR10–2 to hold the relay CR10 in circuit and CR10–1 to establish a circuit through a heating range selector solenoid "C." The heating range selector solenoid "C" (Fig. 10) controls a two-way contact 117 to select which of a pair of taps 118 or 119 of the transformer 77 of coil "C" is to be placed in circuit.

When the furnace is started up or when it is operating normally, contact 119 is closed and the primary of the transformer 77 is shorter and a higher voltage is thus applied to coil "C." During normal operation not only is the temperature range of the billet leaving coil "C" to be maintained at a higher level but also the heating input to coil "C" is maintained at a higher voltage by the continued energization of the heating range selector solenoid "C."

Continued rotation of the sequence contact maker 105 similarly energizes control relays CR9 and CR8 and their associated heat range selector solenoids "B" and "A," in that order, to switch their controlled contacts 120 and 121, respectively, to the shorter primary taps 122 and 123 placing coils "B" and "A" in higher heating range in a manner similar to that already described with respect to coil "C." By thus placing the three heating coils "C," "B" and "A" in their higher heating ranges in sequence, the starting loads on the three coils are not placed on the line simultaneously, but sequentially, so that there is a gradual increase of total load rather than an abrupt increase.

The single cycle sequence contact maker 105 also has an automatic cycle and reset mechanism (not shown) which restores it to its original position upon the completion of a single cycle. When a single cycle has been completed, i. e., when the three contacts 109, 110 and 111 have been each momentarily closed in that order, their respective control relays CR8, CR9 and CR10 are locked in circuit and their respective heating range selector solenoids "A," "B" and "C" energized. This maintains the three coils "A," "B" and "C" in circuit and at their higher heating range throughout the normal operation of the furnace, i. e., as long as control relay CR7 remains energized and its normally open contact CR7–2 remains closed.

During normal operation of the furnace the ram timer 104 periodically effects movement of the ram 28 to insert a new billet into the furnace. The three temperature sensing devices 88, 89 and 90 signal temperatures to their respective controllers "A," "B" and "C" and, depending upon the temperature at each of the three control positions, the three controlled contacts 101, 102 and 103 are closed or opened to energize control relays CR1, CR2 and CR3 and in turn to close or open the main control contacts 73, 80 and 81 placing the coils "A," "B" and "C" in circuit as needed to maintain the proper range of temperature in the furnace.

If for any reason the temperature of a billet being pushed into the discharge chamber 29 should be below the bottom of the range of temperatures desired at that point the sensing device "C" so signals the temperature controller "C" which reacts by moving the duplicate contact 103 to the far left (Fig. 12). Relay CR3 remains closed to continue energy to coil "C" and contact 124 is closed energizing the coil of control relay CR4. Control relay CR4 opens its normally closed contacts CR4–1 and de-energizes the gate control valve solenoid 84. The biasing spring moves the valve 83 to admit fluid pressure into the ram chamber 82 which swings the gate 85 to "reject" position so that the billet then leaving the discharge chamber 29 is deflected into the reject tube 30 and delivered to the cooling chamber 32. Discharging billets continue to be delivered to the reject chute 30 and cooling chamber 32 so long as their temperature remains below the lower limit of the desired range. As soon as a billet enters the discharge chamber 29 the temperature of which falls within the desired range of temperatures, the sensing device 90 signals the temperature controller "C" and its duplicate contact 103 is returned to center position (Fig. 12) breaking the contact 124 and de-energizing the coil of control relay CR4. This allows its contact CR4–1 to reclose and re-energizes the gate control valve solenoid 84 to return the valve 83 to its previous position and the ram 82 swings the gate 35 back to the position shown in Fig. 10.

The control apparatus which has thus far been described has a second function, namely, the operation and control of the furnace during a "standby" period. If, for example, the press or other machine utilizing the billets is shut down, the furnace operator presses the standby button 94, which breaks the circuit to control relay CR7 and opens the main control contacts CR7–2 and CR7–3. Opening contacts CR7–2 de-energizes the heating range selector solenoid "A," "B" and "C" and the temperature range selector 100. This results in the contacts 117, 120 and 121 (Fig. 10) being returned to their left positions to close the contacts 118, 127 and 128 placing the entire primaries of the three transformers 77 in circuit and reducing the voltage on the coils 74, 75 and 76. Breaking contacts CR7–2 also stops the ram timer to prevent the feeding of additional billets into the furnace.

At the same time opening contacts CR7–3 de-energizes the temperature range selectors 100 and shifts the dual range controllers "A," "B" and "C" to their lower temperature control range. Since the temperature sensing devices 88, 89 and 90 sense temperatures higher than the low range they signal the three temperature controllers "A," "B" and "C" to break the three contacts 101, 102 and 103 and de-energize their respective control relays CR1, CR2 and CR3 to take the coils "A," "B" and "C" out of circuit until the temperature in the furnace at the three control positions falls to a temperature within the lower range.

In the lower range positions the controllers "A," "B" and "C" may be set to maintain temperatures, for example, of 900° F., 1200° F. and 1800° F., respectively, within the coils "A," "B" and "C," during standby. The presence of the non-scaling atmosphere in contact with the surfaces of the billets prevents scaling, during "standby," so that the furnace can be maintained in this condition for any desired period of time. When it is desired to resume operation the "run" button 95 can be pushed with safety. When the pushbutton 95 is depressed to resume operation, the sequence contact maker 105 first closes contact 109 to place relay CR10 in circuit, closing its normally open contact CR10–2 and to hold the relay CR10 in circuit and also closing its relay CR10–1 to establish a circuit through the heating range selector solenoid "C," and apply the higher voltage to coil "C." Pushing the contact button 95 also energizes each of the solenoids of the temperature range selector 100 to set the temperature controller "A," "B" and "C" for temperature control in their higher range, so that closing the contact 109 immediately puts coil "C" in operation, with high voltage applied, and controlled in its higher range. Subsequent sequential closing of contacts 110 and 111 similarly puts coils "B" and "A" in high voltage operation, sequentially, but the delay can readily be made sufficient that billets in coil "B" have at least begun the phase change to austenite before the application of high voltage to coil "A" so that, if desired, the induction furnace 20 can be controlled by the circuits of Figs. 10 and 12 so that there is no overload whatsoever upon resumption of normal operation after "shut-down."

It will be apparent that a limited number of the billets in the furnace 20 during a shut-down may be discharged from the coil "C" at a temperature too low for working on the press 23. If this happens, the gate 35 is actuated, as described, and such billets are collected in the chamber 32 for subsequent re-heating. It is anticipated that from 70 to 80 percent of the billets in the furnace at the time of resumption of normal operation after a shut-down will be discharged at a temperature suitable for subsequent forming operations. As a consequence, in apparatus according to the invention, as contrasted with a conventional induction furnace, the "broomsticking" operation previously necessary at the time of a shut-down is eliminated, and substantial production achieved immediately upon resumption of operation, during the time when a conventional furnace would yield no billet ready for subsequent forming.

By virtue of the non-scaling atmosphere in the furnace 20, even the "rejected" billets do not cause surface imperfections on subsequent re-heating and working. Thus, the non-scaling atmosphere in contact with the billet surfaces and the control apparatus of Figs. 10 and 12 cooperate in a novel way to produce a new result. The control circuits of Figs. 10 and 12 constitute means for preventing electrical overload upon resumption of normal operations after a "shut-down" where the billets in at least a portion of the furnace are maintained within the austenitic range during the shut-down.

Control circuits shown in Figs. 11 and 13 maintain work in at least a portion of an induction furnace at a temperature within the austenitic range for the work, and are similar in this respect to the circuits of Figs. 10 and 12 insofar as the mechanism involved in preventing electrical overload upon resumption of normal operation after a "shut-down." However, the precise way in which the temperature control during shut-down is accomplished by the circuits of Figs. 11 and 13 is different from that of the circuits of Figs. 10 and 12. A furnace controlled by the circuits of Figs. 11 and 13 utilizes three straight line induction coils 130, 131 and 132 labeled coils "A," "B" and "C" in Fig. 11, for the induction heating of the billets during normal operation of the furnace. The furnace also has three logarithmically arranged coils 133, 134 and 135, labeled coil "D," coil "E" and coil "F" in Fig. 11, for maintaining the billets at a desired temperature during "standby" operation of the furnace. Coils 130, 131 and 132 are energized and controlled in a manner identical with the control of the three corresponding coils 74, 75 and 76 of Fig. 10. Each of the coils 130, 131 and 132 has its own independent power input pair controlled by contacts of control relays CR1, CR2 and CR3, respectively, and each of them is provided with a heating range selector solenoid denominated "A," "B" and "C," respectively, for the actuation of range selector contacts 136 to taps of their input transformers 137.

The three "Run" induction coils "A," "B" and "C" are energized under control of single range temperature controllers "A," "B" and "C," respectively (Fig. 13), which are responsive to signals received from temperature sensing devices 138 also labeled "A," "B" and "C" in Fig. 11. As in the case of the circuit earlier described, when the temperature of a billet falls below the lower side of the operating temperature range at any one of the three control points, the particular temperature sensing device signals this condition to its associated temperature controller "A," "B" or "C" and closes a contact 139, 140 or 141 to energize the coil of its respective relay CR1, CR2 or CR3 to close its contacts and energize the primary of the particular transformer 137. The temperature controllers "A," "B" and "C" and the controlled relays CR1, CR2 and CR3 operate only within a single temperature range since the induction coils 130, 131 and 132 are employed only during normal running of the furnace.

As in the case of the circuit of Figs. 10 and 12 operation of the control circuit illustrated in Figs. 11 and 13 is initiated by closing a "run" pushbutton 142 which locks in a central relay CR7 by closing its normally open contact CR7-1. Other contacts CR7-2 and CR7-3 also are closed to energize, respectively, a ram timer 143 and a single cycle sequence contact maker 144 in a manner similar to that explained with respect to the ram timer 104 and single sequence contact maker 105 of Fig. 12. Closing contacts CR7-3 of Fig. 13 establishes circuits through the contacts controlled by the single range temperature controllers "A," "B" and "C" in the same manner as closing the similar relay contacts of Fig. 12.

During normal operation of the furnace constructed and controlled as shown in Figs. 11 and 13, when the temperature controller "C" senses a billet outside the control range a reject gate 146 (Fig. 11) is actuated so that the billet responsible for the "off" temperature indication is transferred to the cooling chamber 32 for subsequent recycling.

When it is desired to put the furnace constructed and controlled as shown in Figs. 11 and 13 on standby, an operator pushes the hold button 94 which breaks the circuit to control relay CR7 and de-energizes its main contacts CR7-1, CR7-2 and CR7-3. As in the case of the circuits of Figs. 10 and 12 this de-energizes the regular induction coils 130, 131 and 132 by the opening of contact CR7-3. In addition, opening contacts CR7-2 de-energizes the ram timer 143 and the mechanism controlled thereby.

In contrast to the arrangement of the circuits of Figs. 10 and 12, however, the three logarithmic coils 133, 134 and 135 are now brought into circuit by the reclosing of normally closed contacts CR7-5, CR7-6 and CR7-7 (Fig. 11) which control the three lines of a three-phase circuit between the legs of which the coils 133, 134 and 135 may be connected. In Fig. 11 the connection of the coils 133, 134 and 135 to a three-phase circuit is illustrative only of a conventional wiring arrangement.

Figure 14:
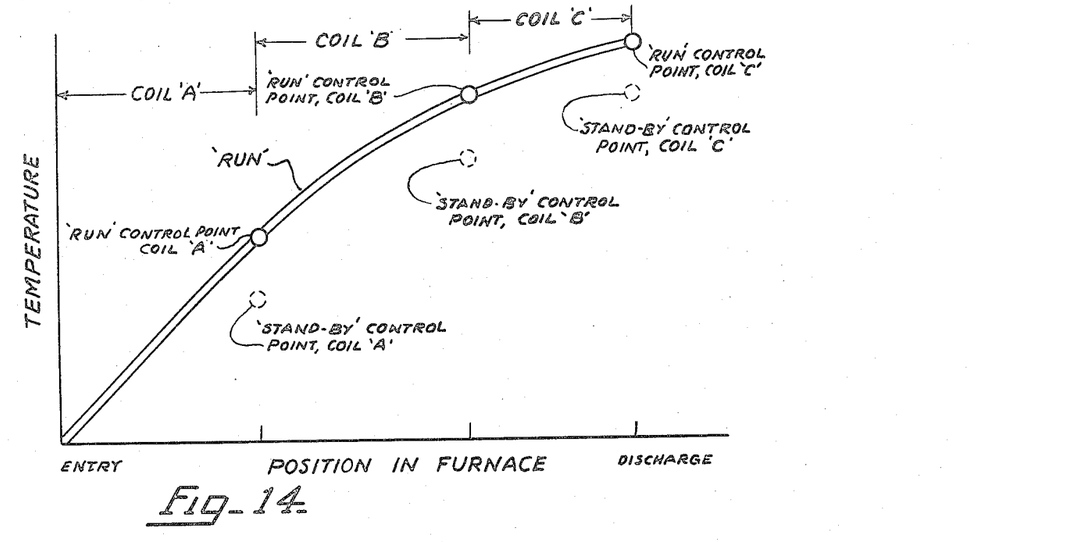
Fig. 14 is a graph illustrating the operation of a furnace having coils of the type shown in Fig. 4 and controlled by the circuits of Figs. 10 and 11.

Operating conditions in an induction furnace controlled by the circuits of Figs. 10 and 12 are illustrated in Fig. 14, which shows a pair of solid lines representing a "run" temperature curve extending upwardly from the left (at the charge end of the furnace) to the right (at the discharge end of the furnace). This curve is achieved by on-off control of the power input to coils "A," "B" and "C" in response to indications from the temperature sensing devices "A," "B" and "C," as transmitted to the dual range temperature controllers "A," "B" and "C," when maintained in their high range control. The "run" control points for coils "A," "B" and "C" are indicated by solid line circles on the "run" curve. In essence, the control apparatus described, during the "run" condition, energizes or de-energizes coil "A," "B" or "C" whenever the corresponding temperature sensing device indicates a temperature for a billet at the discharge end of the appropriate coil below or above, respectively, the appropriate control point. The "run" curve for billet temperature is achieved by virtue of the movement at regular intervals of billets through the furnace during normal operation. As a result of such movement, residence time, and therefore billet temperature, are direct functions of billet position in the furnace.

Control conditions during "standby" are represented in Fig. 14 by the broken line circles. The control points for each of the three coils have been lowered in order to avoid any possibility of overheating and melting billets at the discharge end of the furnace, and pushing has been discontinued, as described. Disregarding such factors as irregularities in composition, size and shape of billets and unequal heat losses from various portions of the furnace, all of the billets in coil "A" should ultimately reach the control temperature; all the billets in coil "B" should ultimately reach the coil "B" control temperature; and all the billets in coil "C" should ultimately reach the coil "C" control temperature. This enables resumption of normal operation from "standby" at any desired time without substantial electrical overload, as described.

Figure 15:
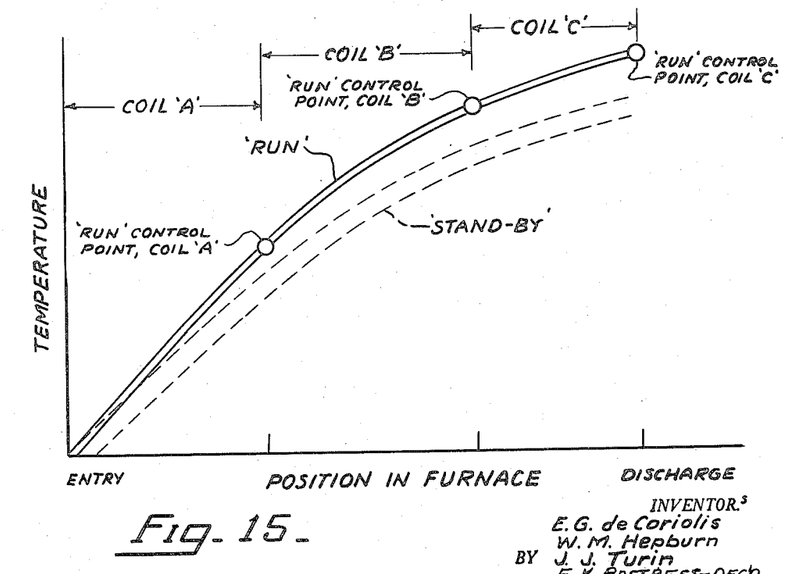
Fig. 15 is a graph similar to Fig. 14, but illustrating the operation of a furnace having coils of the type shown in Fig. 6, controlled by the circuits of Figs. 11 and 13.

Comparison of Fig. 15 with Fig. 14 shows that the two temperature curves for the "run" condition are identical, the assumption being made that the two furnaces to be controlled are identical in construction (except for the standby coil) and that billets of the same size, magnetic characteristics, etc. are being fed at the same rate. The three control points indicated on Fig. 15 are also identical with those indicated on Fig. 14 for normal operation. In Fig. 15, however, a broken double curve labeled "standby" indicates the range of heat potential maintained by the three logarithmic coils "D," "E" and "F" during standby operation of the furnace. By reason of the logarithmic arrangement of the turns of the coils "D," "E" and "F," billets standing in different parts of each of these coils can be maintained at different temperatures. Those billets at the entrance ends of each of the coils "D," "E" and "F" can be kept at a lower temperature than those billets at the exit ends of each. As a result, the standby temperatures can be maintained uniformly a fixed number of degrees below the temperature curve of the billets during normal operation of the furnace, as shown. Therefore, when the furnace is re-energized for running, the billets are brought up to the curve throughout the furnace and none of them is overheated or left underheated while bringing some other billets up to operating temperature. If desired the position of the "standby" broken line curve can be raised, even to substantial correspondence with the solid line "run" curve, or lowered any desired extent. Appropriate adjustment of the tap switches 149 accomplishes such raising or lowering.

Both the control mechanism of Figs. 11 and 13 and that of Figs. 10 and 12 prevent electrical overload because billets or other blanks in at least a portion of the furnace are maintained during standby at a temperature within their austenitic range. This is a preferred way to operate, because the apparatus is in a condition to deliver billets ready for a hot forming operation as soon as an operator pushes the "run" button. The control apparatus of Figs. 11 and 13 is most preferred, because substantially all of the billets in the furnace during "shut-down" can be delivered at a temperature within the proper range for such forming. The invention also contemplates, however, combinations which are less fully automatic but where a nonscaling atmosphere, as described, is combined with means for preventing electrical overload upon resumption of normal operation after a shut-down. An example of such control apparatus is shown in Figs. 16 and 17.

Figure 16:
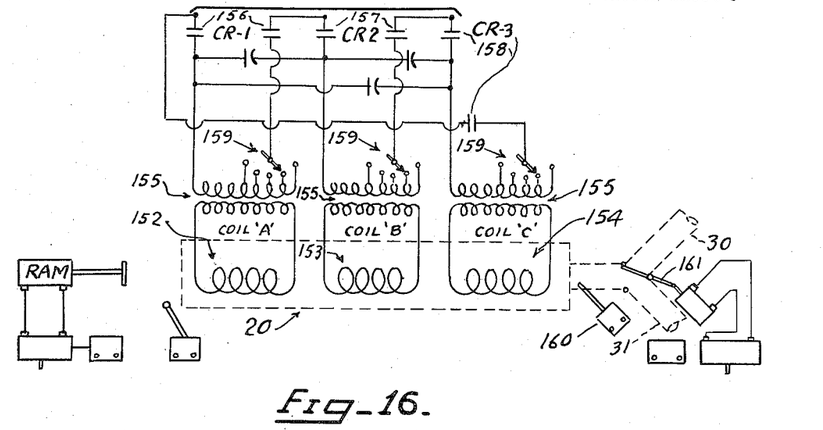
Fig. 16 is a schematic wiring diagram of an electric circuit for energizing in a modified way the coils of induction heating furnace constructed according to the invention and utilizing the form of coils shown in Figs. 4 or 6.
Figure 17:
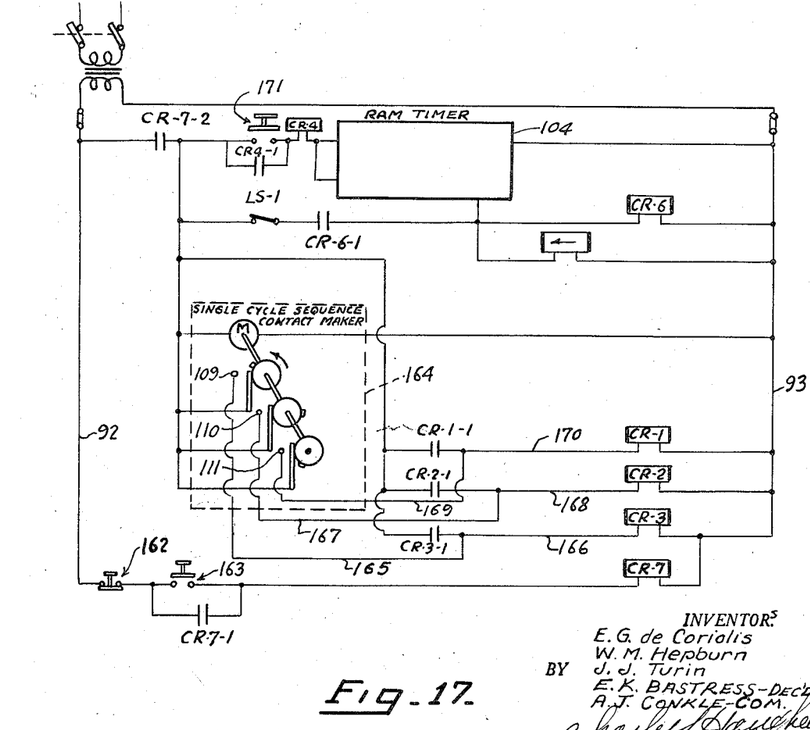
Fig. 17 is a schematic wiring diagram of an electrical circuit for energizing in a still further modified way the coils of an induction heating furnace constructed according to the invention and using the form of coils shown in Fig. 4 or 6.

The two circuits illustrated in Figs. 16 and 17 are designed for the control of a furnace embodying the invention and utilizing three straight line induction coils 152, 153 and 154 labeled coils "A," "B" and "C" in Fig. 16, for the induction heating of the billets. Each of the coils "A," "B" and "C" is energized through its own transformer 155 from a power source, with each pair of power leads controlled by a pair of normally open contacts 156, 157 or 158, respectively. The three pairs of contacts 156, 157 and 158 are actuated by control relays CR1, CR2 and CR3, respectively, to be described in connection with Fig. 17, and are so labeled in Fig. 16.

The three transformers 155 are energized through manually adjustable tap switch selectors 159, so that an operator can manually vary the effective length of the transformer primaries and, therefore, the secondary voltages of each of the coils "A," "B" and "C."

In normal operation of the furnace, as controlled by the circuits of Figs. 16 and 17, the normally open contacts 156, 157 and 158 are closed by relays CR1, CR2 and CR3, respectively, and billets or other metal blanks are pushed through the furnace by the ram, in the manner described. In this structure the ram timer is provided with a manual interval control (not illustrated) so that the operator can increase or decrease the interval between the pushing of succeeding billets into the furnace 20 to compensate for a billet temperature below or above, respectively, the desired temperature range.

A temperature sensing device 160 actuates a gate 161 to direct billets discharged from the furnace 20 into a chute 30 leading to the press 23 or into a chute 31 leading to the cooling chamber 32, depending upon whether billet temperature is within or outside the desired control range, as described.

If desired, the temperature sensing device 160 or the gate 161 can be arranged in any suitable manner (not illustrated) to give the furnace operator a visible or audible signal indicating whether billet temperature is within, above, or below the desired range. Alternatively, operation can rely upon the ability of the operator to estimate billet temperature on the basis of billet color, as perceptible by him in a suitable mirror arrangement (not illustrated). In order to change substantially the rate at which billets or other metal blanks are heated in the furnace 20, as controlled by the circuits of Figs. 16 and 17, an operator manually adjusts the tap switch selectors 159 to increase or decrease the length of the primaries of the transformers 159 and thereby decreases or increases, respectively, the power input to the coils "A," "B" and "C." In order to compensate for an increase or decrease in the power input to the coils, the operator must increase or decrease, respectively, the rate at which billets are pushed into the furnace.

When it becomes necessary to switch a furnace controlled as shown in Figs. 16 and 17 to a "standby" condition, an operator presses a "standby" button 162 to break the circuit from the side 92 of the control circuit power supply through a control relay CR7 to the opposite side 93 of the power supply. De-energization of the control relay CR7 opens a normally open control CR7–1, thus breaking a holding circuit around a "run" button 163. De-energization of the control relay CR7 also opens a normally open contact CR7–2, which de-energizes the ram timer 104 and control relays CR1, CR2 and CR3 to open normally open contacts CR1, CR1–1, CR2, CR2–1, CR3, and CR3–1, thus completely de-energizing coils "A," "B" and "C." The presence of a non-scaling atmosphere in the furnace 20, in contact with the surfaces of the billets therein, prevents the formation of any scale during "standby," regardless of its duration.

In order to resume operation after "standby," an operator pushes the "run" button 163 to establish a momentary circuit through the control relay CR7, which closes the contacts CR7–1 and CR7–2. Closing of the contact CR7–1 establishes a holding circuit around the "run" button 163, while closing of the contact CR7–2 establishes a circuit through a single cycle sequence contact maker 164 which is structurally identical with the contact makers 105 and 144. The contact maker sequentially energizes coils "C," "B" and "A," in that order, by closing contacts 109, 110 and 111, at intervals of from one to two minutes in the specific embodiment shown. Closing the contact 109 establishes a circuit through a line 165 and a line 166 to energize a control relay CR3. Energization of the control relay CR3 closes normally open contacts CR3 to energize the coil "C," and also closes contacts CR3–1 to establish a holding circuit around the contact maker 164. Similarly, closing the contact 110 establishes current through a line 167 and a line 168 to a control relay CR2, which energizes the coil "B" by closing the normally open contacts CR2, and establishes a holding circuit around the contact maker 164 by closing the normally open contacts CR2–1. Closing the contact 111 establishes a circuit through a line 169 and a line 170 to energize the control relay CR1, which energizes the coil "A" by closing the normally open contacts CR1, and establishes a holding circuit around the contact maker 164 by closing the normally open contacts CR1–1.

The control circuits of Figs. 16 and 17 leave to the discretion of the operator the time interval between the energization of coil "C" and the resumption of the billet charging operation. When the operator determines that billet charging should commence, he merely presses a normally open ram timer contact button 171 which energizes a control relay CR4, and also the ram timer 104. Energization of the control relay CR4 closes normally open contacts CR4-1 to establish a holding circuit around the button 171.

It will be apparent that various controls other than those shown in the attached drawings and specifically discussed in connection therewith can be used to prevent electrical overload upon resumption of normal operation of an induction furnace after a "shut-down" or "standby" period. For example, tap switch selectors can be employed as described in connection with Figs. 11 and 16 to increase, during standby condition, the lengths of transformer primaries used to energize each of a plurality of inductors, and thereby reduce the voltage applied to the inductors and maintain a condition generally similar to that illustrated in Fig. 14. Further, the motor generators used to supply power to the inductors of a furnace can, themselves, be regulated, so that they deliver only a low voltage upon resumption of operation after standby, which low voltage is progressively increased to normal supply voltage as the temperature of billets or other blanks in the furnace increases.

Various other changes and modifications can be made from the specific details shown and described without departing from the spirit of the attached claims. In its essential details the invention provides apparatus for induction heating of metal work comprising an inductor, means for energizing the inductor, means for moving work through the field of the inductor, jacket means enclosing work moving within the field of the inductor, enclosed duct means for conveying work from the discharge end of the jacket means to an associated hot-metal working device, and means for establishing and maintaining a non-scaling atmosphere within the jacket means and within the duct means.

What we claim is:

1. Apparatus for induction heating of metal work comprising an inductor, means for energizing said inductor, means for moving work through the field of said inductor, jacket means enclosing work moving within the field of said inductor, a cooling chamber, enclosed duct means for conveying work from the discharge end of said jacket means to an associated hot-metal working device, enclosed reject duct means for conveying work from the discharge end of said jacket means to said cooling chamber, means for establishing and maintaining a non-scaling atmosphere within said jacket means, within said cooling chamber, and within each of said duct means, and means for directing work into said duct means when the temperature of work discharged from the field of said inductor is within a desired control range, and for directing work into said reject duct means when the temperature of the work discharged from the field of said inductor is outside the desired control range.

2. Apparatus for induction heating of metal work comprising an inductor, means for energizing said inductor, means for moving work through the field of said inductor, jacket means enclosing work moving within the field of said inductor, a cooling chamber, enclosed duct means for conveying work by gravity from the discharge end of said jacket means to an associated hot-metal working device, enclosed reject duct means for conveying work by gravity from the discharge end of said jacket means to said cooling chamber, means for establishing and maintaining a non-scaling atmosphere within said jacket means, within said cooling chamber, and within said reject duct means, means for inducing a flow of the non-scaling atmosphere from within said jacket means through said duct means, and means for directing work into said duct means when the temperature of work discharged from the field of said inductor is within the desired control range, and for directing work into said reject duct means when the temperature of the work discharged from the field of said inductor is outside the desired control range.

3. Apparatus for inductive heating of metal work comprising an inductor, a second inductor radially spaced relative to the first inductor, said second inductor comprising a plurality of spaced turns which are separated from one another by a fixed distance at the work charge end of the inductor and by a distance which decreases progressively toward the work discharge end of the inductor, means for moving work through the fields of said inductors, means for energizing said first inductor when said moving means is operating, jacket means enclosing work moving within the field of said inductors, means for establishing and maintaining a non-scaling atmosphere within said jacket means, means for de-energizing said first inductor when said moving means is inactivated, and means for energizing said second inductor, when said moving means is inactivated, to maintain substantially the billet temperature distribution which prevails when the apparatus is in normal operation.

4. Apparatus for inductive heating of metal work as claimed in claim 3 wherein the progressive decrease in distance between successive turns of said second inductor is substantially a logarithmic decrease.

5. Apparatus for inductive heating of metal work as claimed in claim 3 wherein both said first inductor and said second inductor are composed of a plurality of separately energizable inductor segments.

6. Apparatus for inductive heating of metal work comprising an inductor composed of a plurality of inductor segments, separate means for energizing each of said inductor segments, a second inductor radially spaced relative to the first inductor, and composed of a plurality of inductor segments, each of said inductor segments of said second inductor comprising a plurality of spaced turns which are separated from one another by a fixed distance at the work charge end of the inductor segment and by a distance which decreases progressively toward the work discharge end of the inductor, separate means for energizing each of said inductor segments of said second inductor, means for moving work through the fields of said inductors, means for enabling the energization of said first inductor when said moving means is operating, and for preventing energization thereof when said moving means is inactivated, means for preventing the energization of said second inductor when said moving means is operating, and for enabling, when said moving means is inactivated, the energization thereof to maintain substantially the billet temperature distribution which prevails when the apparatus is in normal operation.

References Cited in the file of this patent

UNITED STATES PATENTS

| | | |
|---|---|---|
| 1,646,498 | Seede | Oct. 25, 1927 |
| 2,293,047 | Denneen et al. | Aug. 18, 1942 |
| 2,396,613 | Somes | Mar. 12, 1946 |
| 2,402,852 | Strickland | June 25, 1946 |
| 2,490,107 | Strickland | Dec. 6, 1949 |
| 2,572,073 | Strickland | Oct. 23, 1951 |
| 2,676,234 | Lackner et al. | Apr. 20, 1954 |